A. D. FIZER.
EGG TESTING DEVICE.
APPLICATION FILED NOV. 22, 1911.
1,032,888.
Patented July 16, 1912.
2 SHEETS—SHEET 1.
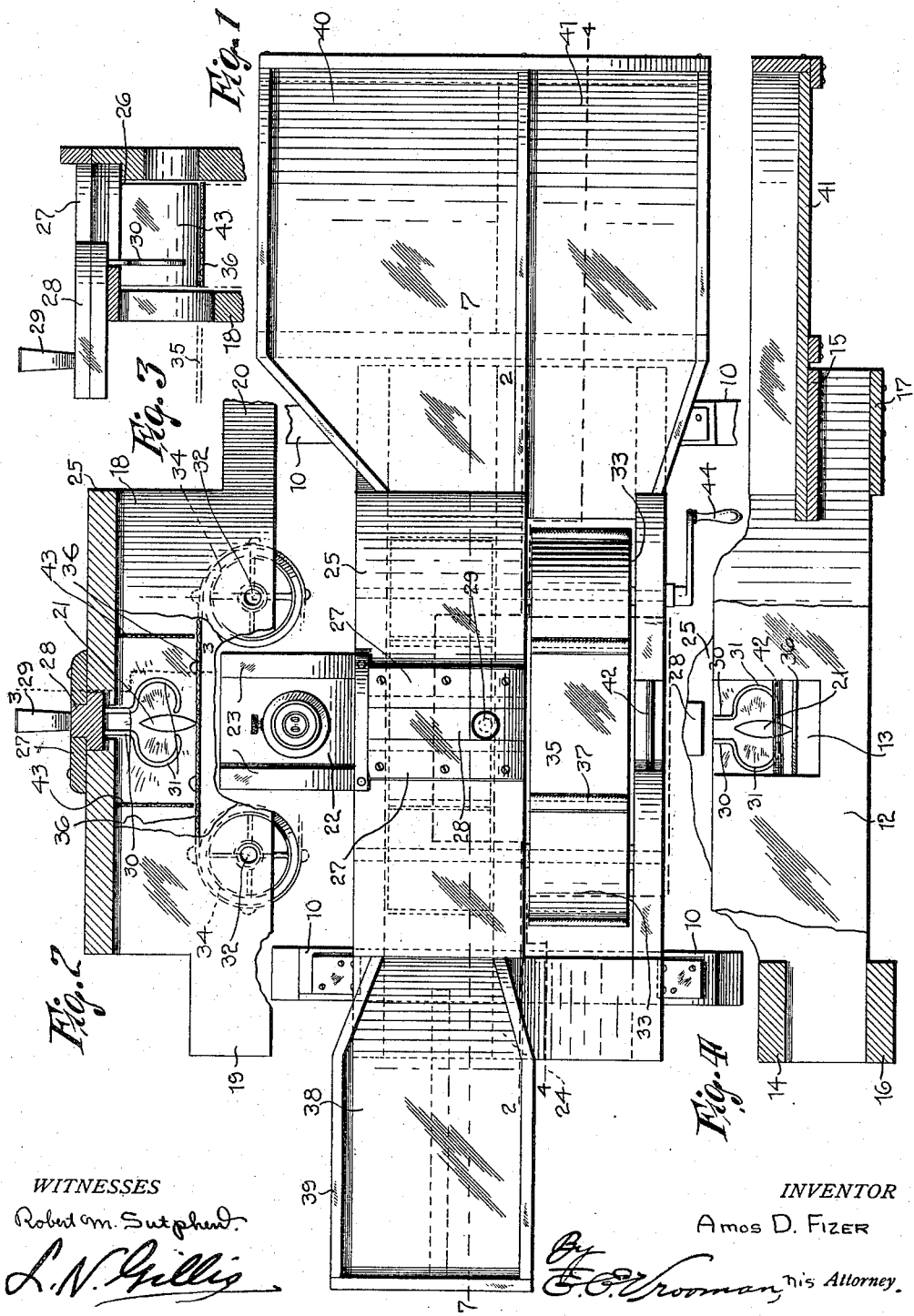
WITNESSES
Robert M. Sutphend
L. N. Gillis
INVENTOR
Amos D. Fizer
By _____, his Attorney.

A. D. FIZER.
EGG TESTING DEVICE.
APPLICATION FILED NOV. 22, 1911.
1,032,888.
Patented July 16, 1912.
2 SHEETS—SHEET 2.
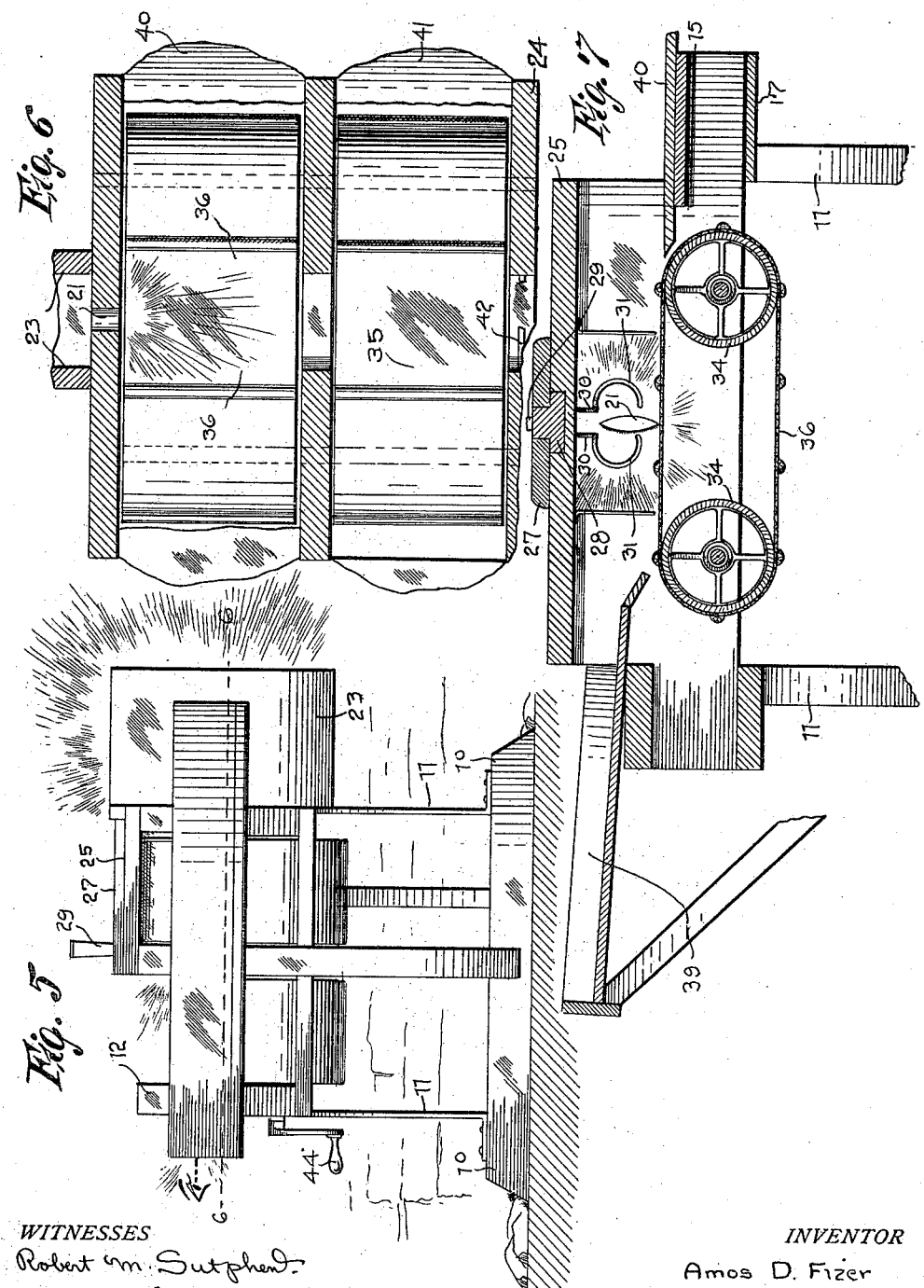
WITNESSES
Robert M. Sutphen
L. N. Gillis
INVENTOR
Amos D. Fizer
By E. E. Crooman, his Attorney.

UNITED STATES PATENT OFFICE.

AMOS D. FIZER, OF CHETOPA, KANSAS, ASSIGNOR OF ONE-HALF TO ANDREW P. FREE, OF CHETOPA, KANSAS.

EGG-TESTING DEVICE.

1,032,888.  Specification of Letters Patent.  Patented July 16, 1912.

Application filed November 22, 1911. Serial No. 661,727.

*To all whom it may concern:*

Be it known that I, AMOS D. FIZER, a citizen of the United States, residing at Chetopa, in the county of Labette and State of Kansas, have invented certain new and useful Improvements in Egg-Testing Devices, of which the following is a specification, reference being had therein to the accompanying drawing.

This invention relates to egg testing devices and has special reference to a device intended to aid in the ready separation of good eggs from eggs which are decayed or otherwise spoiled.

The principal object of the invention is to improve the general construction of devices of this character.

Another object of this invention is to provide means of an improved character whereby spoiled eggs may be removed from among the good eggs without making it necessary to handle the same.

A third object of the invention is to provide an improved apparatus by means of which the separation of the eggs may be carried on continuously so that a large quantity of eggs may be tested in a relatively short time.

With the above and other objects in view, the invention consists in general of certain novel details of construction and combination of parts as will be hereinafter fully described, illustrated in the accompanying drawings, and specifically set forth in the appended claims.

In the accompanying drawings, like characters of reference indicate like parts in the several views, and Figure 1 is a top plan view of an egg testing device constructed in accordance with this invention. Fig. 2 is a section on the line 2—2, Fig. 1. Fig. 3 is a section on the line 3—3, Fig. 2. Fig. 4 is a section on the line 4—4, Fig. 1. Fig. 5 is an end view of the egg testing device. Fig. 6 is a section on the line 6—6, Fig. 5. Fig. 7 is a section on the line 7—7, Fig. 1.

This invention is preferably supported on a framework whereof there is indicated at 10 the base members and from the rear ends of these base members there extends upwardly a leg 11. Supported on the upper ends of these legs 11 is the testing device which comprises a skeleton casing having front members 12 having a centrally disposed notch 13 and the end of this front piece is reduced for the reception of a cross bar 14, and a similar cross bar 15 is provided at the opposite end. On the under side of the member 12 are provided cross bars 16 and 17. The device is also provided with a rear member 18 having reduced ends 19 and 20 whereto the cross bars just mentioned are attached. This rear member has in alinement with the center of the notch 13 an opening 21. Supported on the rear member is a lamp holder which consists of a base 22 and side shields 23, the base being so arranged as to bring the light or flame of the light in alinement with the opening 21 so the same may be observed through the notch 13. Between the members 18 and 12 is a similar frame member 24 precisely alike in construction to the frame member 12. On top of the members 18 and 24 is secured a cover plate 25 having a slot 26 formed therein and adjacent each side of the slot 26 is a guide 27 for the purpose of guiding a plunger 28 which is provided with a handle 29 extending upward from its forward end. Depending from the guide 28 is a pair of arms 30 which are outwardly curved at their lower ends as indicated at 31. These members 31 are arranged to lie on opposite sides of the opening 21 and closely adjacent thereto when the slide is shoved in.

Journaled in the members 12, 18 and 24 is a pair of shafts 32 whereon are mounted drums 33 and 34, the drums 33 lying between the members 12 and 24, and the drums 34 lying between the members 24 and 18. Around each pair of the drums thus arranged extends a canvas belt, the belt around the drum 33 being indicated at 35 while that around the other drum is indicated at 36. On each of these belts flights 37 are provided in spaced relation and these flights are preferably made of some soft material such as canvas or other flexible material of which the belt is made. At one end of the belt 36 is a feed tray or hopper 38 which is surrounded on the sides and end by a rim 39, the mouth of the hopper adjacent the belt being left open. This feed tray is inclined downwardly as can be seen by reference to Fig. 7, and this outer end is supported by a suitable strut 39. Leading from the other end of this belt 36 is a receiving tray 40 and from the end of the belt 35 adjacent this receiving tray there is a second receiving tray 41. These receiving trays are preferably inclined slightly downward toward the back ends, the inclination being very slight. Across the notch 13 extends a bar or rod 42 which prevents any of the eggs from rolling out through the notch when delivered to the belt 35. At either side of the opening 21 there is suspended a flexible curtain of soft dark material as indicated at 43 so that the light is prevented from spreading laterally and light is also prevented from entering from the ends of the space beneath the cover plate 25.

In the operation of the device the eggs to be candled are placed in the tray 38 and a crank handle 44 being attached to one of the shafts 32, is rotated so that the upper portions of the belts move from the direction of the trays 38 to the trays 40 and 41. As the eggs pass in front of the opening 21 the operator observes them through the notch 12 and the corresponding notch in the member 24. As soon as he observes a bad or defective egg he moves the handle 29 toward the notch 13 and this will cause that egg to be engaged by the members 31 and moved outwardly to the belt 35. The continued rotation of the belts will deliver the eggs to the trays 40 and 41 respectively according as to whether they have been moved out on the belt 35 or left on the belt 36. In this manner the constant rotation of the belts slowly will permit the uninterrupted candling of the eggs as they pass the opening 21.

There has thus been provided a simple and efficient device of the kind described and for the purpose specified. It is obvious that many minor changes may be made in the form and construction thereof without departing from the material principles thereof and it is therefore not desired to confine the invention to the exact form herein shown and described but it is wished to include all such as properly come within the scope of the appended claims.

Having thus described the invention, what is claimed as new, is:—

1. In an egg testing device, an egg carrying belt, a light at one side of and slightly above said belt, and means to move eggs laterally from said belt.

2. In an egg testing device, a casing, a belt moving in said casing and adapted to carry eggs, said casing being provided with an opening past which said eggs move, a lamp holder outside of said casing arranged to hold a lamp opposite said opening, a flexible screen depending from said casing on opposite sides of said opening to prevent the entering of light longitudinally of said casing.

3. An egg testing device, a casing, a belt movable in said casing, a second belt parallel to the first mentioned belt and adjacent thereto, fingers depending from the top of the casing and movable transversely thereof, and means to move said fingers.

4. In an egg testing device, a casing provided with alined openings, a belt arranged to move past said openings, a second belt arranged to move past said openings, a second belt arranged beside the first-named belt and movable therewith, a slide arranged to move transversely of the first-named belt, fingers depending from the slide, said fingers being disposed on opposite sides of the openings, and depending flexible light screens supported from the upper side of said casing and having their lower ends adjacent the first-named belt.

5. In an egg testing device, a casing consisting of a front member, a rear member and an intermediate member arranged in parallel relation, said front and intermediate members being each provided with a notch, and the rear member being provided with an opening in alinement with said notches, a lamp holder to the rear of the rear member arranged to hold the lamp in alinement with the opening and notches, a belt between the rear and intermediate members, a second belt between the front and intermediate members, and means to move the eggs carried upon the first named belt laterally to the second belt.

6. In an egg testing device, a casing consisting of a front member, a rear member and an intermediate member arranged in parallel relation, said front and intermediate members being each provided with a notch and the rear member being provided with an opening in alinement with said notches, a lamp holder to the rear of the rear member arranged to hold a lamp in alinement with the opening and notches, a belt between the rear and intermediate members, a second belt between the front and intermediate members, and means to move eggs carried upon the first mentioned belt laterally to the second belt, said means comprising depending fingers arranged on each side of said opening, and means to move said fingers laterally toward the notch in the intermediate member.

7. In an egg testing device, a casing consisting of a front member, a rear member and an intermediate member arranged in parallel relation, said front and intermediate members being each provided with a notch and the rear member being provided with an opening in alinement with said notches, a lamp holder to the rear of the rear member arranged to hold a lamp in alinement with the opening and notches, a belt between the rear and intermediate members, a second belt between the front and intermediate members, means to move the eggs carried upon the first mentioned belt laterally to the second belt, said means comprising depending fingers arranged on each side of said opening, means to move said fingers laterally toward the notch in the intermediate member, and depending screens of flexible opaque material at either side of said opening.

8. In an egg testing device, a casing consisting of a front member, a rear member and an intermediate member arranged in parallel relation, said front and intermediate members being each provided with a notch and the rear member being provided with an opening in alinement with said notches, a lamp holder to the rear of the rear member arranged to hold a lamp in alinement with the opening and notches, a belt between the rear and intermediate members, a second belt between the front and intermediate members, means to move the eggs carried upon the first mentioned belt laterally to the second belt, said means comprising depending fingers arranged on each side of said openings, means to move said fingers laterally toward the notch in the intermediate member, depending screens of flexible opaque material at either side of said opening, delivery means at one end of the belt between the rear and intermediate members, and receiving means at the other end of each belt.

In testimony whereof I hereunto affix my signature in presence of two witnesses.

AMOS D. FIZER.

Witnesses:
ANDREW P. FREE,
WILLIAM W. EDMUNDSON.

Copies of this patent may be obtained for five cents each, by addressing the "Commissioner of Patents, Washington, D. C."